United States Patent
Chen et al.

(10) Patent No.: US 8,041,556 B2
(45) Date of Patent: Oct. 18, 2011

(54) CHINESE TO ENGLISH TRANSLATION TOOL

(75) Inventors: Yen-Fu Chen, Austin, TX (US); John W. Dunsmoir, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 11/291,537

(22) Filed: Dec. 1, 2005

(65) Prior Publication Data
US 2007/0129932 A1    Jun. 7, 2007

(51) Int. Cl.
*G06F 17/20* (2006.01)
*G06F 17/28* (2006.01)

(52) U.S. Cl. ............. 704/5; 704/2; 704/4; 704/6; 704/7; 704/8

(58) Field of Classification Search ................. 704/1–10
See application file for complete search history.

(56) References Cited

U.S. PATENT DOCUMENTS

| | | | |
|---|---|---|---|
| 6,173,252 B1 * | 1/2001 | Qiu et al. ........................ | 704/9 |
| 6,311,152 B1 * | 10/2001 | Bai et al. ........................ | 704/9 |
| 6,385,568 B1 * | 5/2002 | Brandon et al. ................. | 704/7 |
| 6,466,036 B1 * | 10/2002 | Philipp ........................... | 324/678 |
| 6,530,039 B1 * | 3/2003 | Yang .............................. | 714/38 |
| 6,848,080 B1 * | 1/2005 | Lee et al. ....................... | 715/203 |
| 6,859,771 B2 * | 2/2005 | Xun et al. ....................... | 704/1 |
| 7,136,805 B2 * | 11/2006 | Wang .............................. | 704/9 |
| 7,191,115 B2 * | 3/2007 | Moore ............................. | 704/2 |
| 7,353,165 B2 * | 4/2008 | Zhou et al. ...................... | 704/5 |
| 7,366,654 B2 * | 4/2008 | Moore ............................. | 704/2 |
| 7,505,895 B2 * | 3/2009 | Ono ................................ | 704/4 |
| 7,853,444 B2 * | 12/2010 | Wang et al. ..................... | 704/2 |
| 7,865,358 B2 * | 1/2011 | Green et al. .................... | 704/10 |
| 2003/0236658 A1 * | 12/2003 | Yam ............................... | 704/2 |
| 2005/0010391 A1 | 1/2005 | Chen et al. | |
| 2005/0027547 A1 | 2/2005 | Chen et al. | |
| 2005/0065771 A1 | 3/2005 | Chen et al. | |
| 2005/0273314 A1 * | 12/2005 | Chang et al. .................... | 704/4 |

OTHER PUBLICATIONS

The Johns Hopkins University 2003 Chinese-English Machine Translation System, Byrne et al, Center for Language and Speech Processing, Johns Hopkins University, 2003.*

Automatic Evaluation of Machine Translation Quality Using N-gram Co-Occurrence Statistics, Doddington, 2002.*

Fung, P. 1995. A pattern matching method for finding noun and proper noun translations from noisy parallel corpora. In Proceedings of the 33rd Annual Meeting on Association for Computational Linguistics (Cambridge, Massachusetts, Jun. 26-30, 1995). Annual Meeting of the ACL. Association for Computational Linguistics, Morristown, NJ, 236-243. DOI=.*

(Continued)

*Primary Examiner* — Talivaldis I Smits
*Assistant Examiner* — Matthew Baker
(74) *Attorney, Agent, or Firm* — Yee & Associates, P.C.; Mark C. Vallone; Rudolf O. Siegesmund

(57) ABSTRACT

A Chinese to English Translation Tool (CETT) locates pre-existing translations of phrases and increases probabilities for a match by searching independently of proper nouns and Western characters. The CETT comprises an enhancement program, a search program and a display program. The CETT is adapted to access a translation database, a proper noun table, and an unmatched translation table. The translation database is a central repository of an accumulated body of translated literature. The proper noun database is a table showing the associations between English and Chinese for proper nouns.

10 Claims, 4 Drawing Sheets

OTHER PUBLICATIONS

Chiang, D. 2005. A hierarchical phrase-based model for statistical machine translation. In Proceedings of the 43rd Annual Meeting on Association for Computational Linguistics (Ann Arbor, Michigan, Jun. 25-30, 2005). Annual Meeting of the ACL. Association for Computational Linguistics, Morristown, NJ, 263-270. DOI= http://dx.doi.org/10.3115/121984.*

Wu, D. 1994. Aligning a parallel English-Chinese corpus statistically with lexical criteria. In Proceedings of the 32nd Annual Meeting on Association for Computational Linguistics (Las Cruces, New Mexico, Jun. 27-30, 1994). Annual Meeting of the ACL. Association for Computational Linguistics, Morristown, NJ, 80-87. DOI= http://dx.doi.org/10.3115/.*

Chen, H. and Lee, J. 1996. Identification and classification of proper nouns in Chinese texts. In Proceedings of the 16th Conference on Computational Linguistics—vol. 1 (Copenhagen, Denmark, Aug. 5-9, 1996). International Conference on Computational Linguistics. Association for Computational Linguistics, Morristown, NJ, 222-229. DOI= http.*

Emerson, Thomas. Segmenting Chinese in Unicode Segmenting Chinese in Unicode. $16^{th}$ International Unicode Conference. Amsterdam, Mar. 2000.*

Yunbo Cao and Hang Li. 2002. Base Noun Phrase translation using web data and the EM algorithm. In Proceedings of the 19th international conference on Computational linguistics—vol. 1, vol. 1. Association for Computational Linguistics, Morristown, NJ, USA, 1-7. DOI=10.3115/1072228.1072239 http://dx.doi.org/10.3115/1072228.1072239.*

Takaaki Tanaka and Timothy Baldwin. 2003. Noun-noun compound machine translation: a feasibility study on shallow processing. In Proceedings of the ACL 2003 workshop on Multiword expressions: analysis, acquisition and treatment—vol. 18, vol. 18. Association for Computational Linguistics, Morristown, NJ, USA, 17-24. DOI=10.3115/1119282.1119285.*

* cited by examiner

CHINESE TO ENGLISH TRANSLATION TOOL

FIELD OF THE INVENTION

The present invention is related generally to methods of computer implemented translation from Chinese into English, and specifically to a method for improving automated translation of clauses, proper nouns, and embedded western characters.

BACKGROUND OF THE INVENTION

Companies offering web services and service oriented architecture for international businesses include services that translate foreign languages into English. Automated translation tools can provide real time translation capabilities. Asian languages such as Chinese pose special problems for automated translation into English. For example, current automated techniques for translation from Chinese to English do not take into account the idiomatic differences between the languages. Consequently, automated literal translation of Chinese to English bears little resemblance to normal, everyday English, and proper translations can only be achieved by manual translation by Chinese language experts.

However, there exists a large body of Chinese literature translated into English. In the translation of the literature, idiom has been taken into account. There is a considerable wealth of such translated literature today. These translated literary works have already been expertly translated from Chinese to English and vice versa. Moreover, the technology exists to capture and store these translations digitally so that the data can be searched at high speed. For example, the availability of 64 bit computing and very large memories allow for efficient high speed searching of such captured translations. A variety of methods for converting Chinese literature to digital format are known to persons skilled in the art.

Chinese is a well structured language with specific character orders. Chinese has no spaces between words, but it does use commas to separate clauses and periods at the end of sentences. There are no spaces between words and each character carries a specific meaning. These characteristics of the Chinese language raise the possibility of using electronic files of translated literature for automated Chinese to English translation because the chance of finding a match in the wealth of literature is very high. In addition, the fact that Chinese has no real tenses, gender, cases or plurals, reduces the variety of different sentence structures considerably.

If such a search could be made, several problems exist. First, proper nouns may be translated in several ways. For example, in English our reference to the main Chinese river is "Yangtze". However, in Chinese this refers to a fish that lives at the mouth of the river. The actual river itself is called the "Chang Jiang," which literally means "long river." Another example is Peking versus Bei Jing, or the "Imperial Palace." Although Chinese has no capital letters, proper nouns can easily be identified from the structure of the sentence.

Second, modern Chinese in use today has many embedded western characters, such as numbers, names and web addresses. Embedded Western characters do not require translation, yet their positioning within the Chinese text to be translated can lessen the likelihood of a match. The accuracy of this translating can be improved if it is made independent of embedded Western characters. Modern Chinese uses many of these, particularly numbers.

What is needed is a tool or method to increase the accuracy of automated translation of Chinese into English by taking advantage of existing expert translations. In addition, need exists for further improvements in accuracy by addressing the impact of proper nouns and embedded Western characters to such a search.

SUMMARY OF THE INVENTION

The invention, which meets the needs identified above, is a Chinese to English Translation Tool (CETT) for locating pre-existing translations of phrases and for increasing probabilities for a match by searching independently of proper nouns and Western characters.

The CETT comprises an enhancement program, a search program and a display program. The CETT is adapted to access a translation database, and a proper noun database. The translation database is a central repository of an accumulated body of translated literature. The proper noun database is a table showing the associations between English and Chinese for proper nouns.

The enhancement program replaces Western characters in the accumulated body of translated literature in the translation database with markers so that the search for a translation can focus entirely on Chinese characters, thereby increasing the chances for a match. The enhancement program further identifies proper nouns in the translation database, and marks the proper nouns with another character indicating a proper noun. The proper nouns may be searched or ignored depending on the search program. The proper nouns are also linked to a proper noun table giving the associations between English and Chinese for these proper nouns. The table will then give the right substitution after a match has been found.

The search program is adapted to access the translation database containing an accumulated body of translated literature and a dictionary. The search program searches the accumulated body of translated literature for a match. The search is done first without removing proper nouns. If there is no match, then the enhancement program is invoked to remove the proper nouns. If a matching clause is found, it will be selected for display. If there are duplicate translation, the clauses at either side will also be selected for display, and a determination will be made which group of clauses is the closest match. The central clause from the group that is the closest match will then be selected for display. If there is no match, a literal translation will be used and a log will be written of these. A translation service of top scholars will translate these correctly and the database will be updated.

The display program presents both the Chinese and the English sources side by side, highlights the text that the search program identifies as a match, and then prompts the user to select or verify the translation. The display program allows the user to modify the highlighted text on either side to correct the idiom translation match.

The CETT may be a pluggable module that can integrate with a search or translation engine (or web browser).

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "Chinese to English Translation Tool" (CETT).

Figure 1:
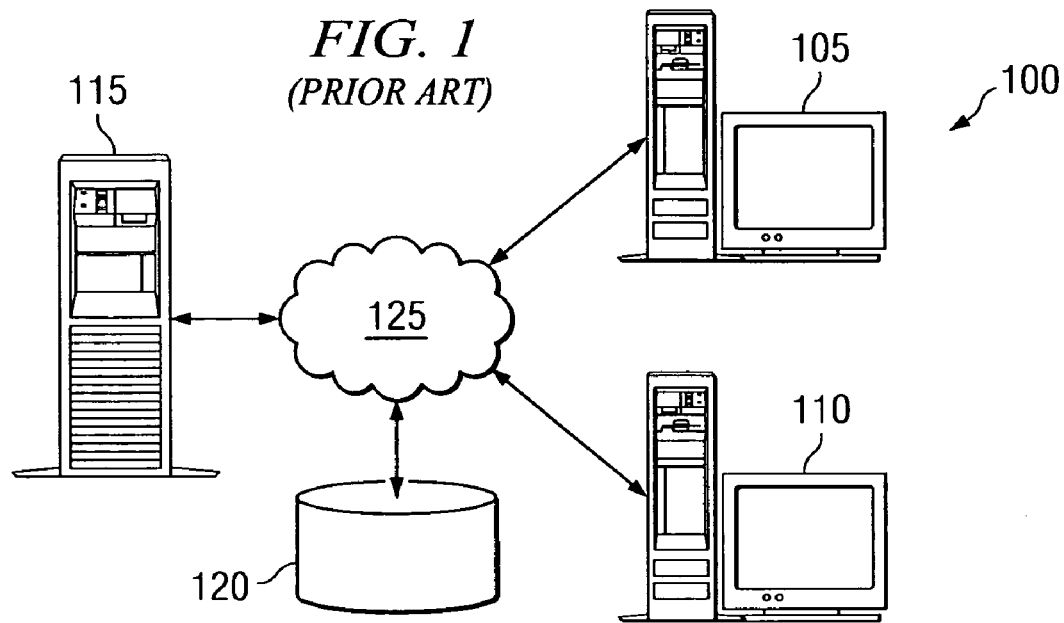
FIG. 1 is an illustration of a computer network used to implement the present invention.

Additionally, the CETT is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
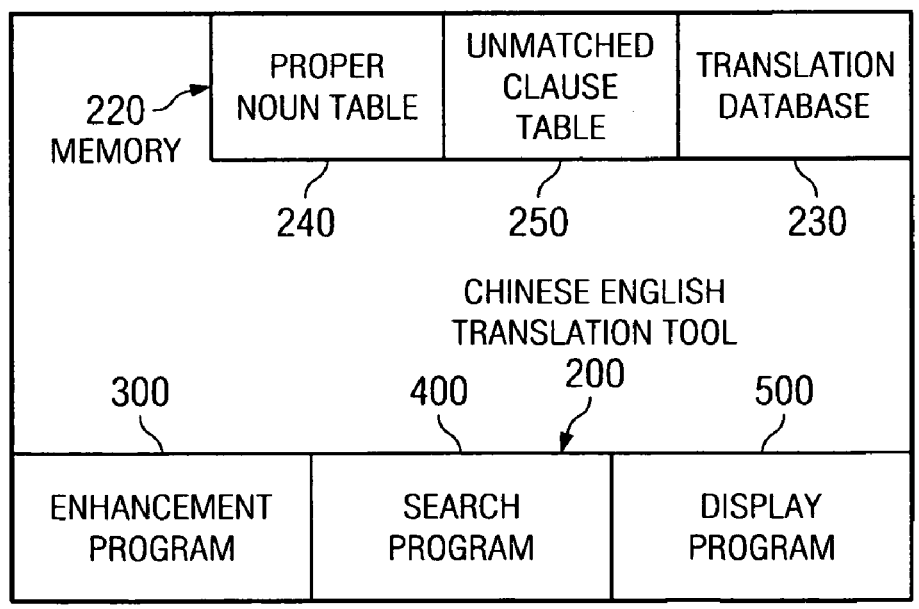
FIG. 2 is an illustration of a memory containing components of the translation system.

CETT 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. CETT 200 comprises enhancement program 300, search program 400, and display program 500. In addition memory 220 includes additional data and programs. Of particular import to CETT 200, memory 220 includes translation database 230, proper noun table 240, and unmatched clause database 250. An existing literal translation program 120 provides literal translation and such programs are known in the art.

Figure 3:
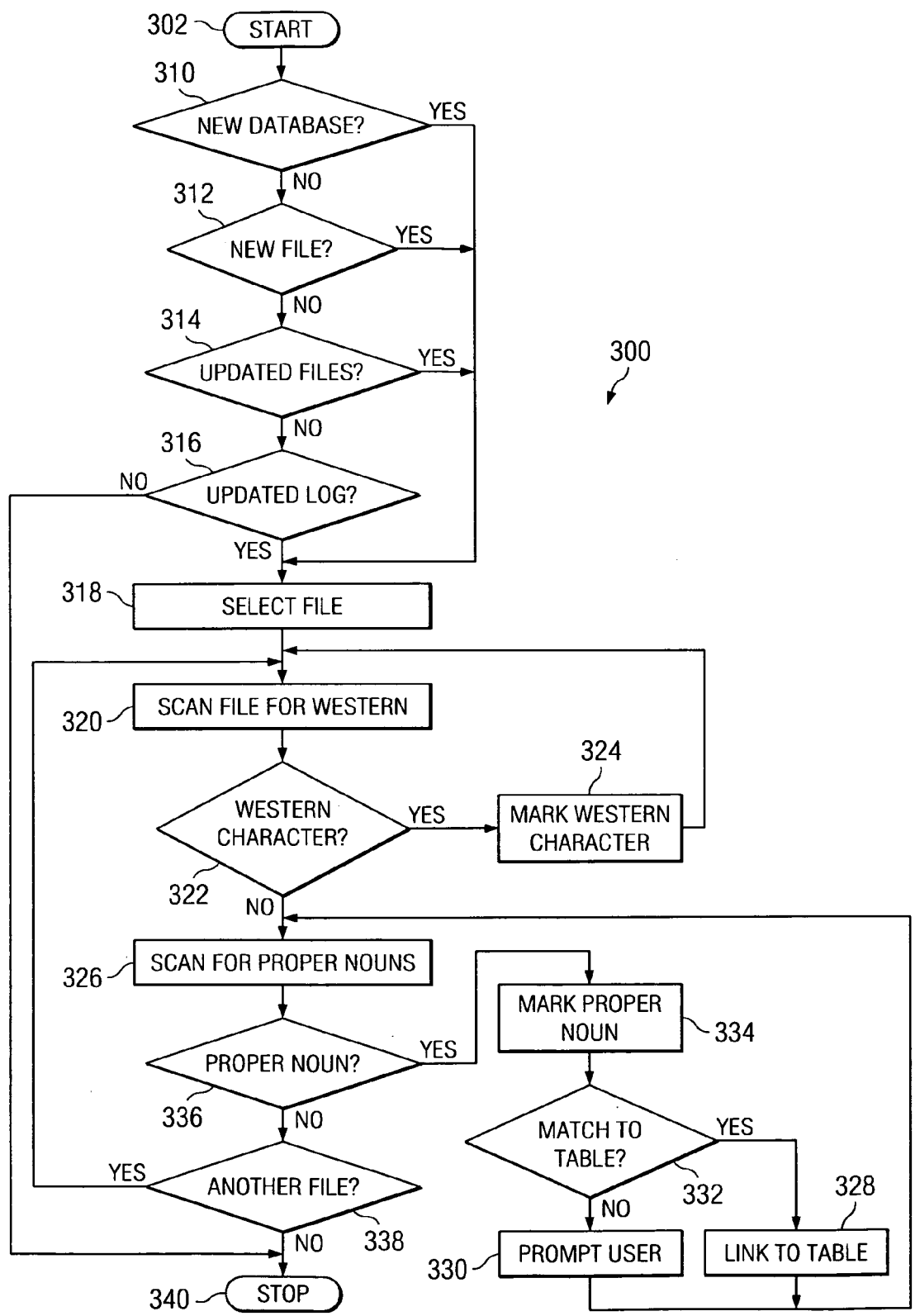
FIG. 3 is a flowchart of the database enhancement program.

FIG. 3 depicts the logic for enhancement program 300. Enhancement program 300 starts (302) and makes a determination whether the processing is for a new database that has not been enhanced (310), an existing database with a new file (312), an existing database with updated files (314), or a database with an updated log of unmatched clause translations (316). If enhancement program 300 makes an affirmative determination at either step 310, 312, 314, 316, then enhancement program 300 will select a file (318) and scan the file for western characters (320). If enhancement program makes a negative determination at steps 312, 314, and 316, it will stop (340). If a western character is found (322) it will be marked (324) and the file will continue to be scanned (320) until a negative determination results at step 322. If a western character is not present, or if all western characters have been marked, enhancement program 300 scans the file for proper nouns (326). If a proper noun is located (336), enhancement program 300 marks the proper noun (334) and determines whether the proper noun matches a proper noun in proper noun table (332). If the proper noun matches a proper noun in the table, the marked proper noun is linked to the proper noun in the table (328) and the scan continues (326) until there are no more proper nouns to examine at step 336. If the proper noun does not match the table, the user is prompted to update the table (330) and the scan continues at step 326. When there are no proper nouns at step 336, enhancement program 300 determines whether there is another file (338), and if so, goes to step 320, and if not, stops (340).

Figure 4:
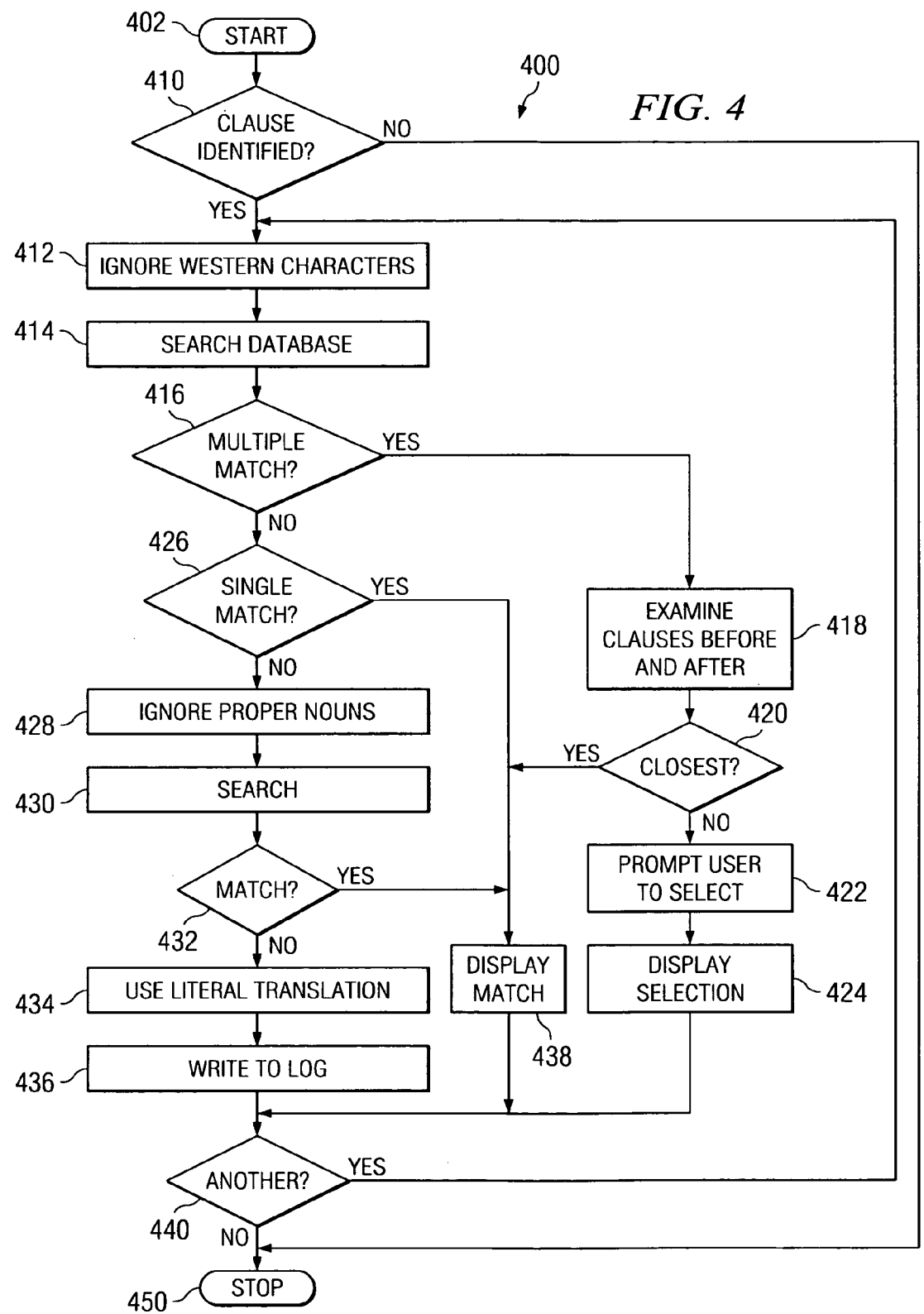
FIG. 4 is a flowchart of the search program.

FIG. 4 depicts the logic for search program 400. Search program 400 starts (402) when invoked and determines whether a user identified a clause for translation (410). If a clause has not been identified, search program 400 stops (450). If a clause has been identified, search program 400 ignores the western characters that have been marked by enhancement program 300 (412). The database is searched (414) and search program 400 determines whether a multiple match has been made (416). If so, the clauses immediately preceding and following the subject clause are examined (418) to determine whether one of the matched clauses from the database is the closest (420). If so, the match is displayed (438), and if not, enhancement program 400 prompts the user to make a selection (422) and displays the selection (424).

If at step 416, the determination is negative, then search program 400 determines if there is a single match (426). If so, the match is displayed (438), and if not, enhancement program 400 ignores all proper nouns marked by enhancement program 300 (428), and searches for a match (430). If a match is found (432), the match is displayed (438). If a match is not found, a literal translation is used (434) and the literal translation and the clause are written to a log for manual translation (436). Search program 400 determines whether there is another identified clause to be translated (440). If so, search program 400 goes to step 412, and if not, stops (450).

Figure 5:
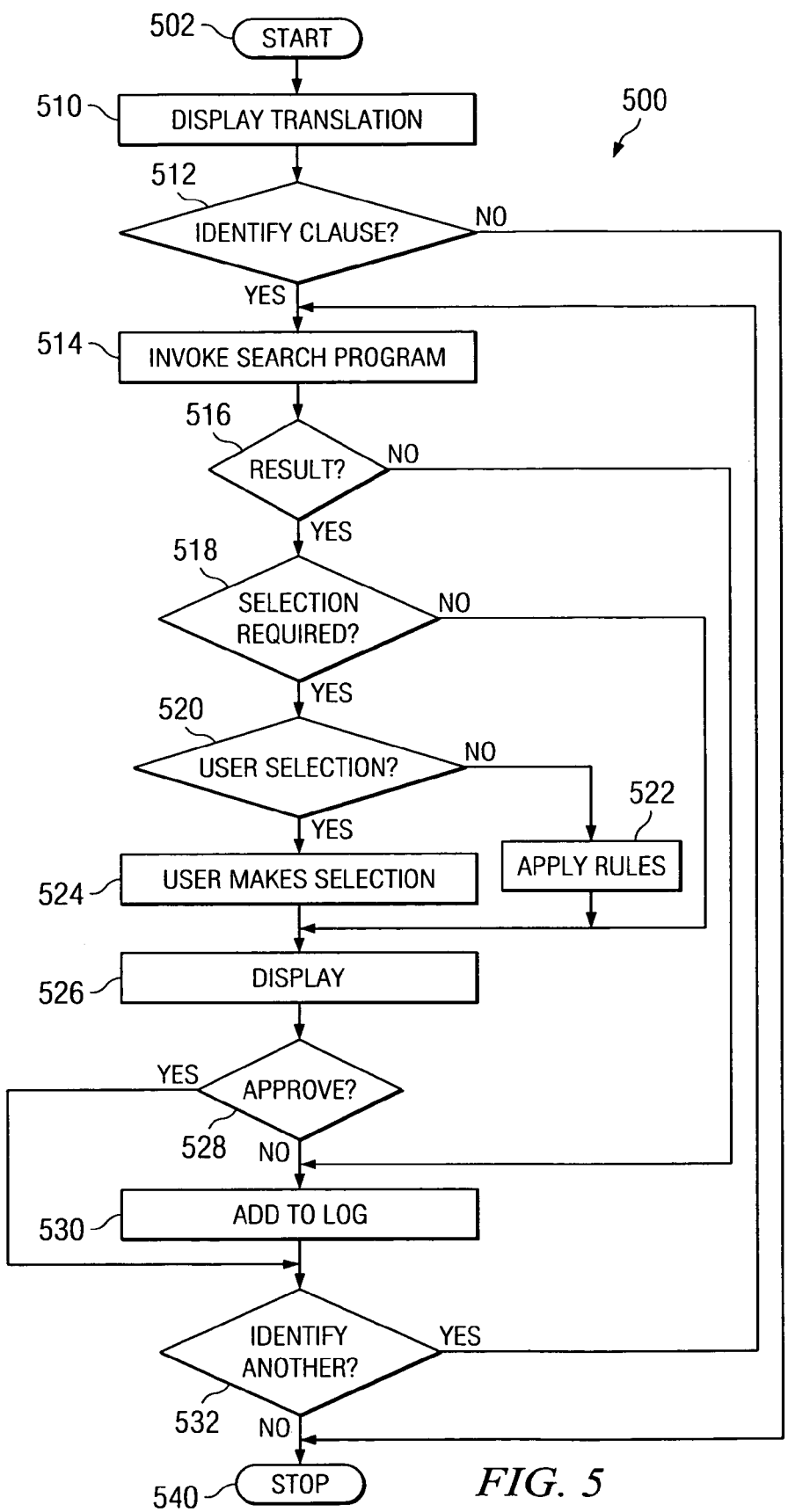
FIG. 5 is a flowchart of the display program.

FIG. 5 depicts the logic for display program 500. Display program 500 starts (502) and displays a literal translation (510). If the user identifies a clause for translation (512), search program 400 is invoked (see FIG. 4), and if not, display program 500 stops (540). After invoking search program 400, display program 500 determines whether there were any results from the search (516). If not, the clause is added to the log for manual translation (530). If there are results, display program 500 determines whether user selection is required (518). User selection is required when there are multiple translations identified for a clause and the user has been prompted to make a selection (see FIG. 4, step 424). If so, display program obtains the user selection (524) and displays the selection (526). If the user does not make a selection, rules are applied to make a selection (522) and the selection is displayed (526). After displaying the selection (526), display program 500 determines whether the user approves the displayed translation (528). If not, the clause is added to the log for manual translation (530), and if so, determines whether another clause has been identified (532). If so, display program 500 goes to step 514, and if not, stops (540).

With respect to the above description, it is to be realized that the optimum dimensional relationships for the parts of the invention, to include variations in size, materials, shape, form, function and manner of operation, assembly and use, are deemed readily apparent and obvious to one of ordinary skill in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A method for locating a pre-existing English translation of a Chinese phrase, the method comprising:
   a computer accessing a database comprising a plurality of phrases in Chinese and a plurality of phrases translated from Chinese into English, wherein each Chinese proper noun in the plurality of phrases in Chinese is associated with a first marker and each Western character in the plurality of phrases in Chinese is associated with a second marker;
   the computer accessing table linking one or more Chinese proper nouns associated with the first marker to one or more of a plurality of English proper nouns in the table;
   the computer identifying a first clause in Chinese for translation into English;
   the computer responsive to identifying the first clause, removing a set of proper nouns from the first clause to form a modified clause and searching for a matching clause in Chinese in the database that matches the modified clause while ignoring any proper nouns and any Western characters in the database;
   the computer responsive to locating the matching clause, identifying an English translation for the matching clause in the database and including one or more English proper nouns from the table in the English translation for each proper noun in the set of proper nouns from the first clause to form a translated clause;
   the computer displaying the first clause and the translated clause on a display;
   the computer responsive to locating a plurality of matching clauses in the database that match the modified clause and a plurality of English translations for one or more of the plurality of matching clauses, identifying a preceding clause that precedes a first matching clause in the plurality of matching clauses and a following clause that follows the first matching clause in the plurality of matching clauses for one or more matching clauses in the plurality of matching clauses to form a plurality of group clauses; and
   the computer responsive to identifying the plurality of group clauses, examining one or more preceding clauses and one or more following clauses from the plurality of group clauses and identifying one of the plurality of matching clauses as a closest match to the modified clause based on the one or more preceding clauses and one or more following clauses from the plurality of group clauses.

2. The method of claim 1 further comprising:
   the computer responsive to a failure to make a match, writing the clause to a file for manual translation.

3. The method of claim 1 further comprising:
   the computer responsive to manually translating the clause, placing the clause and the translation into an unmatched clause file accessible by a search program.

4. A computer system comprising one or more processors, one or more computer-readable memories, one or more computer-readable, tangible storage devices and program instructions which are stored on the one or more computer-readable, tangible storage devices for execution by the one or more processors via the one or more memories and when executed by the one or more processors perform the method of claim 1.

5. A computer program product comprising one or more computer-readable, tangible storage devices and computer-readable program instructions which are stored on the one or more storage computer-readable, tangible devices and when executed by one or more processors perform the method of claim 1.

6. A computer system for locating a pre-existing English translation of a Chinese phrase, the computer system comprising:
   one or more processors, one or more computer-readable memories, and one or more computer-readable, tangible storage devices;
   program instructions, stored on at least one of the one or more computer-readable, tangible storage devices for execution by at least one of the one or more processors via at least one of the one or more computer-readable memories, to access a database comprising a plurality of phrases in Chinese and a plurality of phrases translated from Chinese into English, wherein each Chinese proper noun in the plurality of phrases in Chinese is associated with a first marker and each Western character in the plurality of phrases in Chinese is associated with a second marker;
   program instructions, stored on at least one of the one or more computer-readable, tangible storage devices for execution by at least one of the one or more processors via at least one of the one or more computer-readable memories, to access a table linking one or more Chinese proper nouns associated with the first marker to one or more of a plurality of English proper nouns in the table;
   program instructions, stored on at least one of the one or more computer-readable, tangible storage devices for execution by at least one of the one or more processors via at least one of the one or more computer-readable memories, to identify a first clause in Chinese for translation into English;
   program instructions, stored on at least one of the one or more computer-readable, tangible storage devices for execution by at least one of the one or more processors via at least one of the one or more computer-readable memories, to remove, responsive to identifying the first clause, a set of proper nouns from the first clause to form a modified clause and to search for a matching clause in Chinese in the translation that matches the modified clause while ignoring any proper nouns and any Western characters in the database;
   program instructions, stored on at least one of the one or more computer-readable, tangible storage devices for execution by at least one of the one or more processors via at least one of the one or more computer-readable memories, to identify, responsive to locating the matching clause, an English translation for the matching clause in the database, and to include one or more English proper nouns from the table in the English translation for each proper noun in the set of proper nouns from the first clause to form a translated clause;

program instructions, stored on at least one of the one or more computer-readable, tangible storage devices for execution by at least one of the one or more processors via at least one of the one or more computer-readable memories, to display the first clause and the translated clause at a display;

program instructions, stored on at least one of the one or more computer-readable, tangible storage devices for execution by at least one of the one or more processors via at least one of the one or more computer-readable memories, to identify, responsive to locating a plurality of matching clauses in the database that match the modified clause and a plurality of English translations for one or more of the plurality of matching clauses, a preceding clause that precedes a first matching clause in the plurality of matching clauses and a following clause that follows the first matching clause in the plurality of matching clauses for one or more matching clauses in the plurality of matching clauses to form a plurality of group clauses; and program instructions, stored on at least one of the one or more computer-readable, tangible storage devices for execution by at least one of the one or more processors via at least one of the one or more computer-readable memories, to examine, responsive to identifying the plurality of group clauses, one or more preceding clauses and one or more following clauses from the plurality of group clauses and to identify one of the plurality of matching clauses as a closest match to the modified clause based on the one or more preceding clauses and one or more following clauses from the plurality of group clauses.

7. A computer program product for locating a pre-existing English translation of a Chinese phrase, the computer program product comprising:

one or more computer-readable, tangible storage devices;

program instructions, stored on at least one of the one or more computer-readable, tangible storage devices, to access a database comprising a plurality of phrases in Chinese and a plurality of phrases translated from Chinese into English, wherein each Chinese proper noun in the plurality of phrases in Chinese—is associated with a first marker and each Western character in the plurality of phrases in Chinese is associated with a second marker;

program instructions, stored on at least one of the one or more computer-readable, tangible storage devices, to access table linking one or more Chinese proper nouns associated with the first marker to one or more of a plurality of English proper nouns in the table;

program instructions, stored on at least one of the one or more computer-readable, tangible storage devices, to identify a first clause in Chinese in a document for translation into English;

program instructions, stored on at least one of the one or more computer-readable, tangible storage devices, to remove, responsive to identifying the first clause, a set of proper nouns from the first clause to form a modified clause and to search for a matching clause in Chinese in the database that matches the modified clause while ignoring any proper nouns and any Western characters in the database;

program instructions, stored on at least one of the one or more computer-readable, tangible storage devices, to identify, responsive to locating the matching clause, an English translation for the matching clause in the database, and to include one or more English proper nouns from the table in the English translation for each proper noun in the set of proper nouns from the first clause to form a translated clause;

program instructions, stored on at least one of the one or more computer-readable, tangible storage devices, to identify, responsive to locating a plurality of matching clauses in the database that match the modified clause and a plurality of English translations for one or more of the plurality of matching clauses, a preceding clause that precedes a first matching clause in the plurality of matching clauses and a following clause that follows the first matching clause in the plurality of matching clauses for one or more matching clauses in the plurality of matching clauses to form a plurality of group clauses; and program instructions, stored on at least one of the one or more computer-readable, tangible storage devices, to examine, responsive to identifying the plurality of group clauses, one or more preceding clauses and one or more following clauses from the plurality of group clauses and to identify one of the plurality of matching clauses as a closest match to the modified clause based on the one or more preceding clauses and one or more following clauses from the plurality of group clauses.

8. A method for locating a pre-existing translation of a Chinese clause, the method comprising:

a computer accessing a database comprising a plurality of Chinese phrases and a plurality of English phrases translated from the plurality of Chinese phrases;

the computer locating a Western character in the plurality of Chinese phrases;

the computer locating a Chinese proper noun within the plurality of Chinese phrases;

the computer linking the Chinese proper noun to an English translation of the Chinese proper noun in a table;

the computer identifying the Chinese clause for translation into English, the Chinese clause comprising a proper noun;

the computer removing the proper noun from the Chinese clause;

the computer searching the plurality of Chinese phrases in the database for at least one clause that at least partially matches the Chinese clause while ignoring the Western character and the Chinese proper noun;

the computer, responsive to locating a plurality of clauses in the plurality of Chinese phrases that at least partially match the Chinese clause, locating a preceding clause that precedes a first clause in the plurality of clauses and a following clause that follows the first clause in the plurality of clauses of clauses to form a plurality of group clauses;

the computer identifying one of the plurality of clauses a closest matching clause to the Chinese clause;

the computer identifying an English translation of the closest matching clause in the plurality of English phrases in the database; and the computer including the English translation of the Chinese proper noun within the English translation of the closest matching clause.

9. A computer system comprising one or more processors, one or more computer-readable memories, one or more computer-readable, tangible storage devices and program instructions which are stored on the one or more computer-readable, tangible storage devices for execution by the one or more processors via the one or more memories and when executed by the one or more processors perform the method of claim 8.

10. A computer program product comprising one or more computer-readable, tangible storage devices and computer-readable program instructions which are stored on the one or more storage computer-readable, tangible devices and when executed by one or more processors perform the method of claim 8.

* * * * *